United States Patent
Morio (10) Patent No.: US 9,952,967 B2
(45) Date of Patent: Apr. 24, 2018

(54) METHOD FOR CONTROLLING NONVOLATILE MEMORY AND STORAGE MEDIUM STORING PROGRAM

(71) Applicant: Toshiba Memory Corporation, Minato-ku (JP)

(72) Inventor: Minako Morio, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 116 days.

(21) Appl. No.: 14/840,298

(22) Filed: Aug. 31, 2015

(65) Prior Publication Data

US 2016/0267003 A1 Sep. 15, 2016

Related U.S. Application Data

(60) Provisional application No. 62/130,995, filed on Mar. 10, 2015.

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0659* (2013.01); *G06F 3/0679* (2013.01); *G06F 2212/7202* (2013.01)

(58) Field of Classification Search
CPC .................................................. G06F 12/0246
See application file for complete search history.

(56) References Cited

U.S. PATENT DOCUMENTS

| 6,058,460 A | 5/2000 | Nakhimovsky |
| 7,380,085 B2 * | 5/2008 | Matter .................. G06F 9/5016 711/147 |
| 7,882,344 B2 | 2/2011 | Byun et al. |
| 8,984,267 B2 * | 3/2015 | Tearse-Doyle ........ G06F 9/4401 713/2 |
| 2013/0124778 A1 * | 5/2013 | Arya .................... G06F 12/0246 711/103 |

OTHER PUBLICATIONS

Micron Technical Note, TN-29-59 Bad Block Management in NAND Flash Memory Introduction, 2011.*

* cited by examiner

*Primary Examiner* — Prasith Thammavong
*Assistant Examiner* — Edmund H Kwong
(74) *Attorney, Agent, or Firm* — Oblon, McClelland, Maier & Neustadt, L.L.P.

(57) ABSTRACT

According to one embodiment, a method for controlling a nonvolatile memory includes allocating a first system block to a physical block included in one of the first and second parallel operation elements. The first system block is used by a first CPU controlling the nonvolatile memory but is not used by a second CPU controlling the nonvolatile memory. The method includes allocating a second system block to a physical block included in the other of the first and second parallel operation elements. The second system block is used by the second CPU but is not used by the first CPU.

19 Claims, 8 Drawing Sheets

METHOD FOR CONTROLLING NONVOLATILE MEMORY AND STORAGE MEDIUM STORING PROGRAM

CROSS-REFERENCE TO RELATED APPLICATIONS

This application is based upon and claims the benefit of priority from U.S. Provisional Application No. 62/130,995, filed on Mar. 10, 2015; the entire contents of which are incorporated herein by reference.

FIELD

Embodiments described herein relate generally to a method for allocating a system block of a memory system and a storage medium storing a program.

BACKGROUND

In a memory system such as a solid state drive (SSD), a plurality of blocks arranged inside a flash memory includes blocks in which user data is stored and system blocks in which system data used inside the SSD is stored. The system blocks include a common use block in which common use data used to be common to a plurality of CPUs arranged inside the SSD is stored and a dedicated block in which dedicated data used dedicatedly by each CPU is stored. The common use block, for example, includes a manufacturing information block in which information of physical addresses of had blocks and the like is recorded. The dedicated block, for example, includes a trace log block in which a trace log of each CPU is recorded. Such system blocks may be allocated to the inside of the flash memory.

DETAILED DESCRIPTION

In general, according to one embodiment, a nonvolatile memory includes first and second parallel operation elements that, are individually readable and writable. The first parallel operation element includes a plurality of physical blocks. The second parallel operation element includes a plurality of physical blocks. The physical block is data erasing unit. A method for controlling the nonvolatile memory includes allocating a first system block to a physical block included in one of the first and second parallel operation elements. The first system block is used by a first CPU but is not used by a second CPU. the first CPU controls the nonvolatile memory. the second CPU controls the nonvolatile memory. The method includes allocating a second system block to a physical block included in the other of the first and second parallel operation elements. The second system block is used by the second CPU but is not used by the first CPU.

Hereinafter, a method for controlling a nonvolatile memory and a storage medium storing a program according to embodiments will be described in detail with reference to the accompanying drawings. However, the present invention is not limited to such embodiments.

First Embodiment

Figure 1:
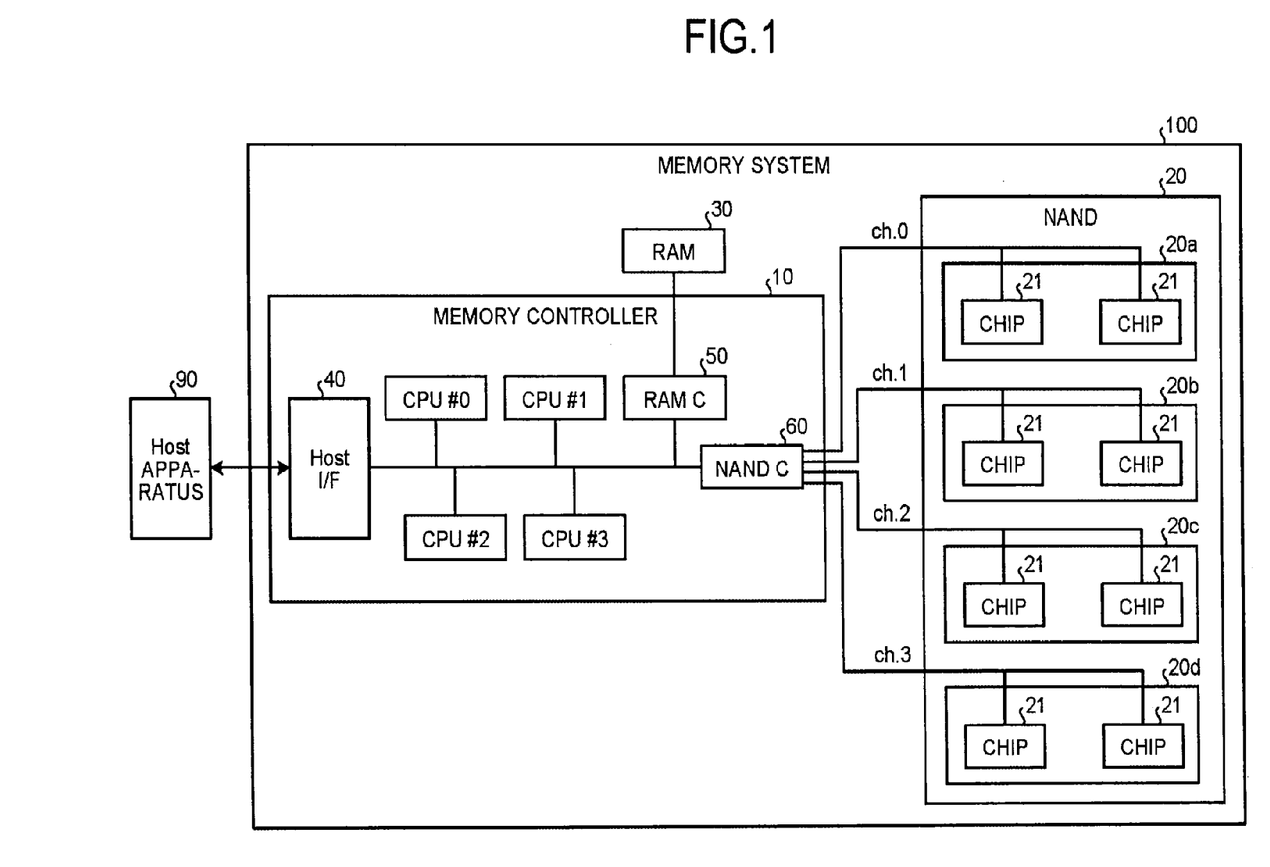
FIG. 1 is a functional block diagram that illustrates the internal configuration of a memory s.

FIG. 1 is a block diagram that illustrates an example of the configuration of a memory system 100 according to a first embodiment. The memory system 100 includes: a memory controller 10; a NAND flash memory (hereinafter, abbreviated as a NAND) 20 as a nonvolatile memory; and a random access memory (RAM) 30. However, the nonvolatile memory described above is not limited to the NAND flash memory. For example, the nonvolatile memory may be a three-dimensional structure flash memory, a resistance random access memory (ReRAM), a ferroelectric random access memory (ReRAM), or the like.

The memory system 100 is connected to a host apparatus (hereinafter, abbreviated as a host) 90 through a host interface 40 and functions as an external memory device of the host 90. The host 90, for example, is a personal computer, a mobile phone, or an imaging apparatus.

Figure 2:
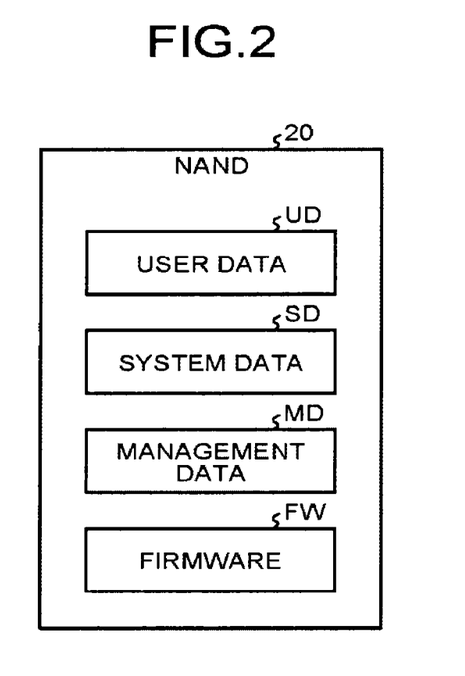
FIG. 2 is a diagram that illustrates information stored in a NAND flash memory.

In the NAND 20, as illustrated in FIG. 2, user data ND transmitted from the host 90, management data MD of the memory system 100, system data SD of the memory system 100, firmware (product firmware to be described later) FW operating the memory system 100, and the like are stored. The NAND 20 is connected to the memory controller 10 through a plurality of channels Ch.0 to ch.3. In other words, the NAND 20 includes a plurality of channel parallel operation elements 20a to 20d connected to mutually-different channels Ch.0 to ch.3. Each of the channel parallel operation elements 20a to 20d includes one or a plurality of memory chips (CHIP) 21. In this embodiment, two memory chips (CHIP) 21 are connected to one channel. Each of the channels Ch.0 to ch.3 includes an I/O signal line and a control signal line. The I/O signal line is a signal line that is used for transmitting/receiving data, an address, and a command. The control signal line is a signal line that is used for transmitting/receiving a write enable (WE) signal, a read enable (RE) signal, a command latch enable (CLE) signal, an address latch enable (ALE) signal, a write protection (WP) signal, and the like. The memory controller 10 can individually control each channel. The memory controller 10 can simultaneously (in parallel) operate the memory chips 21 connected to mutually-different channels by simultaneously and individually controlling four channels.

Figure 3:
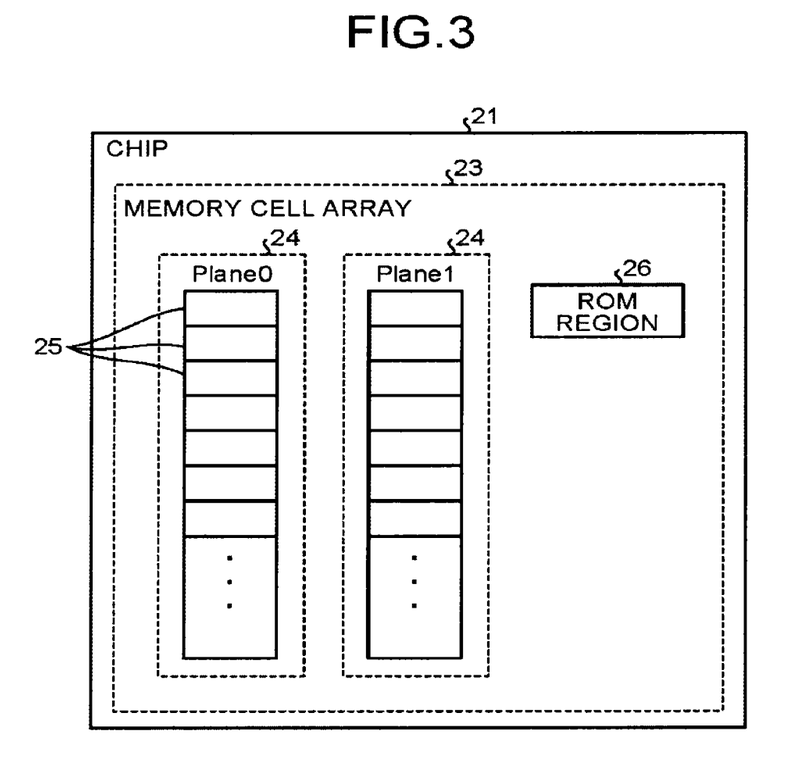
FIG. 3 is a diagram that illustrates the configuration of the inside of a memory chip.

FIG. 3 is a diagram that illustrates an example of the configuration of each memory chip 21. Each memory chip 21 includes a memory cell array 23. The memory cell array 23 includes a plurality of memory cells arranged in a matrix pattern. The memory cell array 23 is divided into one or a plurality of planes. In this embodiment, the memory cell array 23 is divided into two planes (plane 0 and plane 1) 24. Each plane 24 includes a plurality of physical blocks 25. Each plane 24 includes peripheral circuits (for example, a row decoder, a column decoder, a page buffer, and a data cache) that are independent from each other, and a plurality of planes 24 can simultaneously (in parallel) perform erase/write/read.

The memory cell array 23 includes a ROM region 26 in which chip information of memory chip at the time of manufacturing is stored. The ROM region 26 is a part of the memory cell array 23 and, similar to the memory cell array 23, is an area configured by NAND memory cells. For the ROM region 26, data is writable only once, and, after a write operation, data is only readable. In the ROM region 26, chip information different for each memory chip is stored. The chip information includes various kinds of information (a program voltage, a read voltage, an erase voltage, a verify voltage, and the like) at the time of manufacturing the memory chip 21 and initial had block information (including physical addresses of initial bad blocks and the like) for each plane arranged inside the memory chip 21. The chip information of the memory chip described above is written into the ROM region 26 by a manufacturer of the memory chip.

Figure 4:
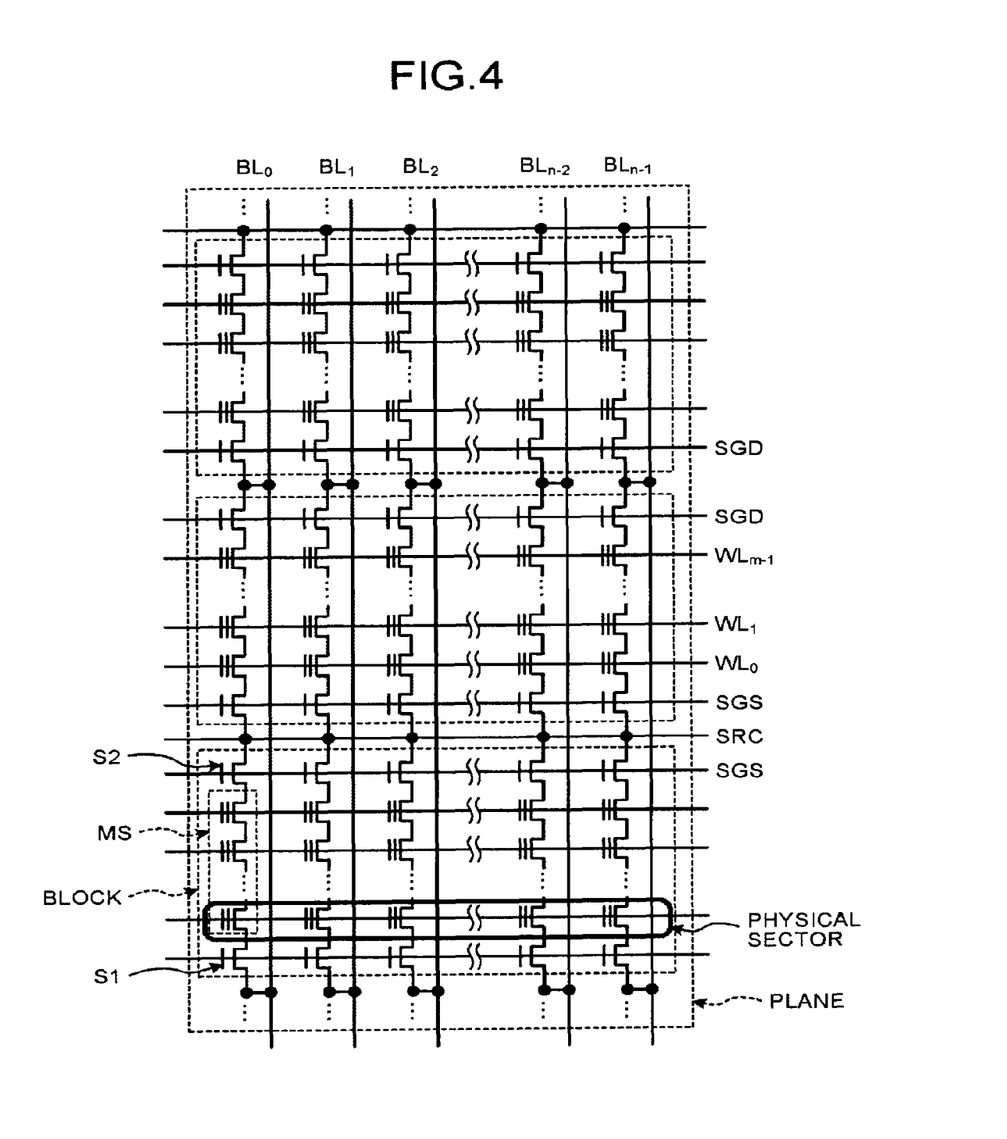
FIG. 4 is a diagram that illustrates an example of the circuit configuration of a memory cell array.

FIG. 4 illustrates the configuration of the memory cell array 23. The memory cell array 23 is a NAND cell-type memory cell array and is configured to include a plurality of memory cells. One memory cell is configured by a memory string MS configured by a plurality of memory cells connected in series and selection gates S1 and S2 connect to both ends thereof. The selection gate S1 is connected to bit lines IL, and the selection gate S2 is connected to a source line SRC. In addition, control gates of memory cells arranged in the same row are connected to be common to word lines WLO to WLm−1. Furthermore, the first selection gates S1 are connected to be common to a select line SGD, and the second selection gates S2 are connected to be common to a select line SGS.

The memory cell array 23 includes one or a plurality of planes, and each plane includes a plurality of physical blocks. Each physical block is configured by a plurality of memory cells, and data is erases in units of the physical blocks.

In addition, a plurality of memory cells connected to one word line configures one physical sector. Data is written and read for each physical sector. In one physical sector, in case of a two bits/cell writing system (four levels), for example, data corresponding to two pages is stored. On the other hand, in case of a one bit/cell writing system (two levels), for example, data corresponding to one page is stored in one physical sector, and, in case of three bits/cell writing system (eight levels), for example, data corresponding to three pages Is stored in one physical sector.

In a read operation or a program operation, one word line is selected according to a physical address, and one physical sector is selected. Page switching within the physical sector is performed using the physical address.

In this way, by simultaneously operating four channels, the memory controller 10 can operate a total of four memory chips 21 in parallel. In addition, the memory controller 10 simultaneously accesses two planes 24 of each memory chip 21. Accordingly, the memory controller 10 can operate eight physical blocks in parallel.

In this memory system 100, logical blocks that are virtual blocks are used as management units of blocks. Each logical block is configured by collecting physical blocks from a plurality of memory chips #0 to #n−1. In this embodiment, in each logical block, physical blocks are combined for performing a chip parallel operation and a plane parallel operation. In the case illustrated in FIG. 1, since the number of channels is four, and the number of planes is too, each logical block includes a maximum of eight physical blocks 25.

As the RAM 30 serving as a volatile memory, an arbitrary type of memory may be used. For example, a dynamic random access memory (DRAM), a static random access memory (SRAM), or a combination of such memories may be used as the RAM 30. In addition, instead of the RAM 30, an arbitrary memory having a speed higher than the NAND 20 may be used.

The RAM 30 includes areas serving as a write buffer and a read buffer used for the transmission of data between the host 90 and the NAND 20. Write data received from the host 90 is temporarily stored in the write buffer and thereafter, is stored in the NAND 20 as the user data UD. Data read from the NAND 20 is temporarily stored in the read buffer and thereafter, is transmitted to the host 90. The RAM 30 is used also as a buffer in which the firmware FW stored in the NAND 20 is loaded. In addition, the RAM 30 is used also as a buffer in which the management data MD stored in the NAND 20 is loaded. The management data MD loaded into the RAM 30 includes a logical/physical translation table, a block management table, and the like.

In the logical/physical translation table, mapping between a logical address used by the host 90 and a physical address of the RAM 30 or a physical address of the NAND 20 is registered. As the logical address, for example, a logical block addressing (LBA) is used. A physical address represents a storage position on the RAM 30 or the NAND 20 in which data is stored.

The block management table, for example, manages block management data as below.

(a) Identification information (physical block addresses) of a plurality of physical blocks configuring a logical block (b) The number of times of erase in units of logical blocks (c) Use state (identification information for identifying an active block or a free block)

(d) Identification information (physical block address) of bad blocks

An active block is a logical block in which valid data is recorded. A free block is a logical block, in which valid data is not recorded, that can be reused by erasing data. A bad block is an unusable physical block that does not normally operate due to various factors.

The memory controller 10 includes: a plurality of central processing units (CPUs) #0 to #3; a host interface (host I/F) 40; a RAM controller (RAMC) 50; and a NAND controller (NANDC) 60. The CPUs #0 to #3, the host I/F 40, the RAMC 50, and the NANDC 60 are interconnected through a bus.

The host I/F 40 is a communication interface such as a serial advanced technology attachment (SATA) or a peripheral component interconnect (PCI) express (PCIe). The host I/F 40 connects the memory system 100 and the host 90 together through a communication line. The host I/F 40 receives a command such as a read command or a write command from the host 90. An address and a size of data transmitted according to the command, the data, and the like are added to the command. When the command is received from the host 90, the host I/F 40 notifies CPU #0 of the command.

The RAMC 50 operates and controls the RAM 30. The NANDC 60 operates and controls the NAND 20. The NANDC 60 writes a code word input from CPU #3 into the NAND 20 under the control of CPU #3. In addition, the NANDC 60 reads a code word from the NAND 20 and transmits the read code word to CPU #3 under the control of CPU #3.

The memory controller 10 includes a plurality of CPUs. In the case illustrated in FIG. 1, the memory controller 10 includes four CPUs #0 to #3. Various functions of the memory controller 10 are shared by the plurality of CPUs #0 to #3. As described above, the firmware (product firmware) EW used for operating the plurality of CPUs #0 to #3 is stored in the NAND 20. When the supply of power is started from the host 90, a startup program stored in a read only memory (ROM) not illustrated in the figure is started up. This startup program loads the product firmware FW of the NAND 20 into the 130. CPUs #0 to #3 execute the product firmware on the RAM 30, thereby realizing various functions to be described later. In this embodiment, for example, functions are shared by CPUs #0 to #3 as below. As the number of CPUs arranged inside the memory controller 10, an arbitrary number of two or more may be employed.

The functions of the memory controller 10, for example, are largely divided into a front end unit and a back end unit. The front end unit controls communication with the host 90 by controlling the host interface 40. The front end unit receives a command from the host interface 40 and transmits the command to the back end unit. In addition, the front end unit controls data transmission between the host 90 and the write buffer and the read buffer the RAM 30.

The back end unit has a function of executing a command that is acquired from the front end unit. The back end unit manages the user data (updates the management data MD and configures the management data to be nonvolatile) and controls a read operation, a write operation, and an erase operation for the NAND 20. The back end unit controls data transmission between the write buffer and the read buffer of the RAM 30 and the NAND 20. In addition, the back end unit executes garbage collection for the NAND 20. CPU #0 controls the front end unit, and CPUs #1 to #3 control the back end unit.

CPU #0

CPU #0 receives a command of the host 90 from the host I/F 40 and, when a process corresponding to the received command is completed, performs a command completion notification for the host I/F 40. CPU #0 analyzes the received command and transmits a result of the analysis to CPU #1 to CPU #3 that control the back end unit.

CPU #1

CPU #1 executes a write/read operation for the write buffer and the read buffer arranged inside the RAM 30 by controlling the RAMC 50. CPU #1 controls writing/reading write data received from the host 90 into/from the write buffer of the RAM 30 and controls writing/reading data read from the NAND 20 into/from the read buffer of the RAM 30. CPU #1 notifies CPU #2 of a request for updating the logical/physical translation table in accordance with writing/reading data into/from the RAM 30.

CPU #2

CPU #2 manages (refers to and updates) the management data MD such as the logical/physical translation table and the block management table. The management data MD is stored in the RAM 30 and the NAND 20. CPU #2 rebuilds the logical blocks, supplies the logical blocks to CPU #3, determines valid data in a compaction process, and transmit read/write request fi compaction to CPU #3.

CPU #3

CPU #3 executes writing/reading/erasing data for the NAND 20 by controlling the NANDC 60. In addition, CPU #3 executes an error correction process. CPU #3 executes an error correction coding process for the write data, generates parity, and generates a code word including the parity and the data. CPU #3 requests the NANDC 60 to write the generated code word. CPU #3 requests CPU #2 to update the management data MD in accordance with the writing of the code word into the NAND 20. CPU #3 executes a decoding process for the code word read from the NAND 20.

In such a memory system 100, a system block for storing system data is built by the manufacturing firmware when the memory system 100 is manufactured. The manufacturing firmware is firmware used for performing various settings and tests at the time of manufacturing the memory system 100. In a stage in which the manufacturing firmware starts to operate, the user data UD, the system data SD, and the product firmware FW described above are not stored in the NAND 20, but the above-described chip information of the memory chip is stored in the ROM region 26 of each memory chip 21.

Figure 5:
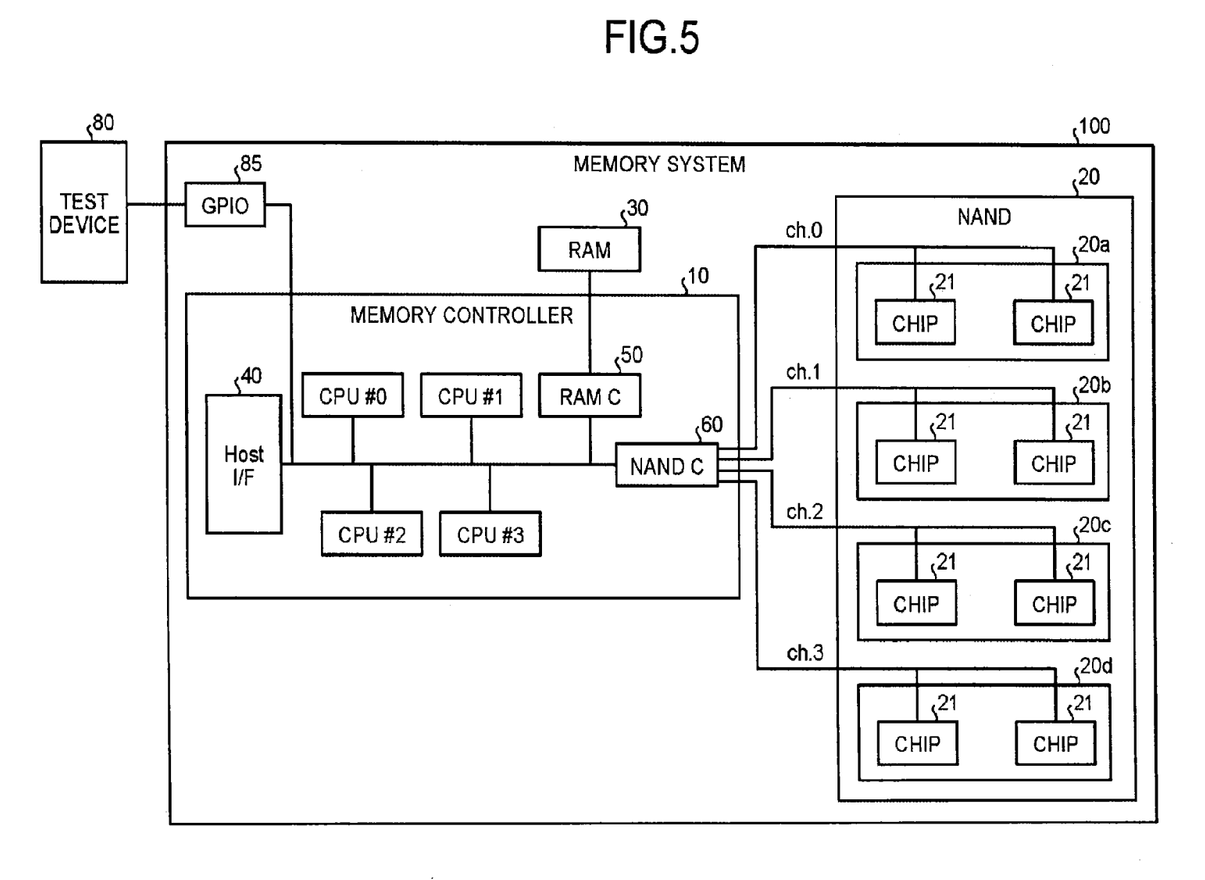
FIG. 5 is a diagram that illustrates an example of the configuration of a manufacturing system at the time of operating manufacturing firmware.

FIG. 5 is a diagram that illustrates an example of the configuration of a manufacturing system at the time of operating manufacturing firmware. The memory system 100, for example, is connected to a test device 80 through a general purpose input/output (GPIO) 85. The test device 80 downloads the manufacturing firmware from a nonvolatile storage medium such as an optical medium or a USE memory, the internet, or the like and loads the downloaded manufacturing firmware into the RAM 30 through the general purpose input/output (GPIO) 85 and the RAMC 50.

Figure 6:
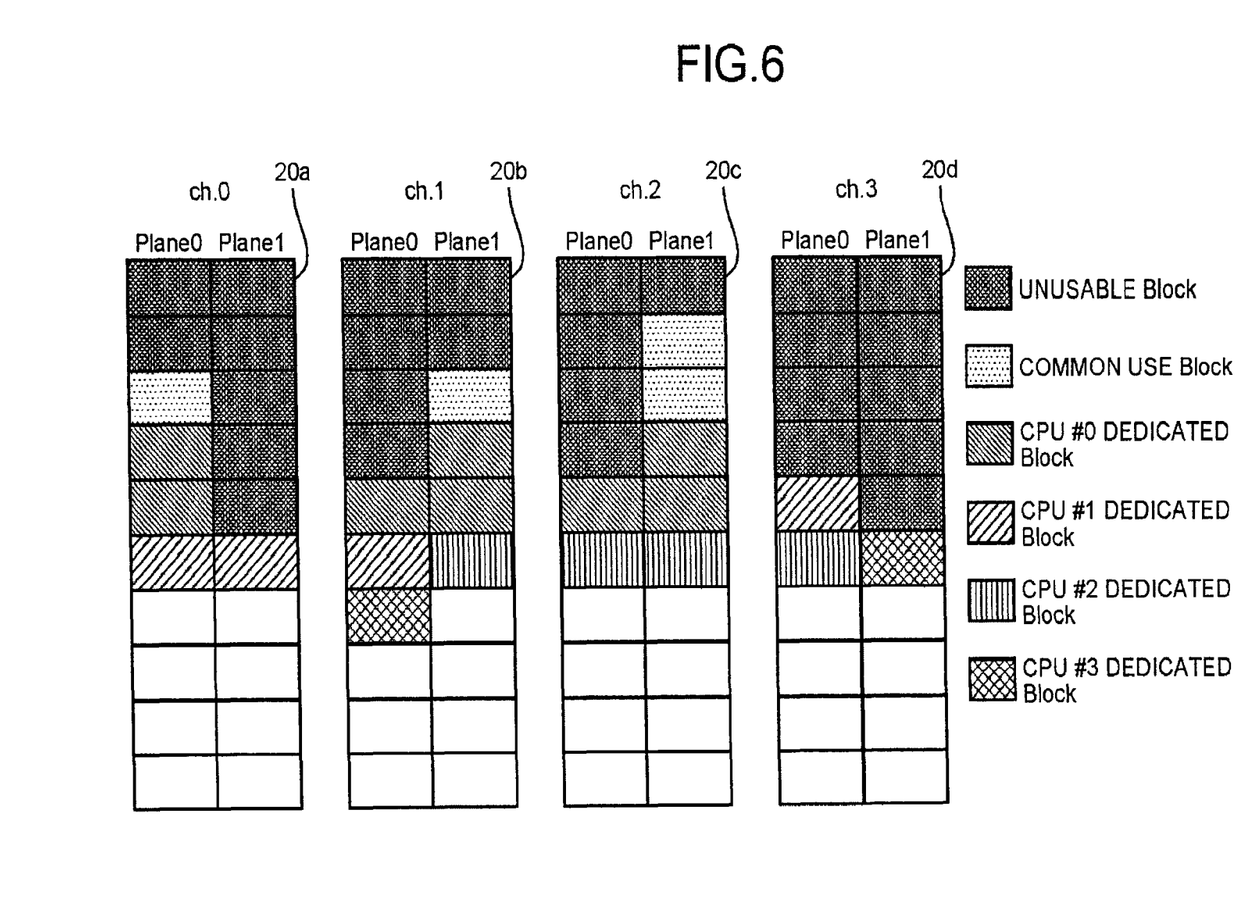
FIG. 6 is a conceptual diagram that illustrates an example of static partitioning of a comparative example.

The test device 80 causes CPUs #0 to #3 to execute the manufacturing firmware loaded into the RAM 30. Accordingly, a static partitioning process as below is executed. FIG. 6 illustrates an example of static partitioning of a comparative example (an example of building a system block). The object of the static partitioning process of the comparative example is to generate more logical blocks in a logical block building process that is executed after the static partitioning. For this reason, in the comparative example, the static partitioning is executed such that the numbers of usable blocks of the planes of the channel parallel operation element are leveled as possibly as can.

In the case illustrated in FIG. 6, the NAND 20 includes four channel parallel operation elements 20a to 20d, and one memory chip includes two planes (plane 0 and plane 1). The manufacturing firmware, first, identifies unusable blocks of each plane. The unusable blocks include initial had blocks within the memory chip 21 and firmware blocks secured for firmware (product firmware) FW of each of the CPUs #0 to #3. Physical address information (plane number+physical block number) of the initial bad blocks, as described above, is stored in the ROM region 26 of each memory chip 21. The initial had blocks are bad blocks that are generated in the manufacturing stage of the memory chip. On the other hand, emerging bad blocks are had blocks that are generated after the registration of initial bad blocks in the ROM region 26. The firmware block is allocated to a predetermined physical address that is fixed inside the NAND 20.

The manufacturing firmware registers the initial bad blocks acquired from the ROM region 26 of each memory chip 21 and the firmware block allocated to the fixed physical block as unusable blocks of each plane.

The manufacturing firmware requests the number Np of usable blocks of each plane. The number Np is acquired by subtracting unusable blocks of each plane from the number of physical blocks of the plane. In the case illustrated in FIG. 6, the number Np of usable blocks of each plane is as follows. The number is eight for plane 0/ch. 0, is five for plane 1/ch. 0, is six for plane 0/ch. 1, is eight for plane 1/ch.

1, is six for plane 0/ch. 2, is nine for plane 1/ch. 2, is six for plane 0/ch. 3, and is five for plane 1/ch. 3.

Next, the manufacturing firmware allocates system blocks to a plane having a large number Np of usable blocks with high priority, thereby leveling the numbers of usable blocks Nq after the allocation among the planes.

The system data SD includes common use data that is used to be common to a plurality of CPUs #0 to #3 and dedicated data used by only one CPU. By performing such a static partitioning process, in the comparative example, four common use blocks in which common use data is recorded are distributed to plane 0/ch. 0, plane 1/ch. 1, and plane 1/ch. 2. In addition, eight CPU #0 dedicated blocks in which dedicated data of CPU #0 recorded are distributed to plane 0/ch. 0, cane 0/ch. 1, plane 1/ch. 1, plane 0/ch. 2, and plane 1/ch. 2. Four CPU #1 dedicated blocks in which dedicated data of CPU #1 is recorded are distributed to plane 0/ch. 0, plane 1/ch. 0, plane 1/ch. 0, plane 0/ch. 1, and plane 0/ch. 3. In addition, four CPU #2 dedicated blocks in which dedicated data of CPU #2 is recorded are distributed to plane 1/ch. 1, plane 0/ch. 2, plane 1/ch. 2, and plane 0/ch. 3. Two CPU #3 dedicated blocks in which dedicated data of CPU #3 is recorded are distributed to plane 0/ch. 1 and plane/ch. 3. In the comparative example, the number Nq of usable blocks of each plane after the allocation is as follows. The number is four for plane 0/ch. 0, is four for plane 1/ch. 0, is three for plane 0/ch. 1, is four for plane 1/ch. 1, is four for plane 0/ch. 2, is four for plane 1/ch. 2, four for plane 0/ch. 3, and is four for plane 1/ch. 3.

As above, according to the technique of the comparative example, there is a possibility that CPU dedicated blocks are distributed to a plurality of channels. Since the size of the system data SD that is read or written by one CPU for one time is smaller than that of the user data UD, the performance improvement according to parallel accesses over the channels, as in the case of logical blocks used for the user data UD, cannot be expected much. For this reason, in case of the comparative example, in a case where a plurality of CPUs use the system data SD during a normal operation, a situation in which a plurality of CPUs access the same channel occurs. In a case where such a situation occurs, it is necessary to make a plurality of accesses to the same channel in a serial manner, and accordingly, it takes time to access the system data SD.

Thus, in this embodiment, the manufacturing firmware does not allocate CPU dedicated blocks that are dedicatedly used by the other CPUs to the same channel. In other words, in this embodiment, only one or a plurality of CPU dedicated blocks that are dedicatedly used by one CPU are allocated to one channel. Accordingly, in this embodiment, parallel operations can be executed when a plurality of CPUs access corresponding CPU dedicated block.

Figure 7:
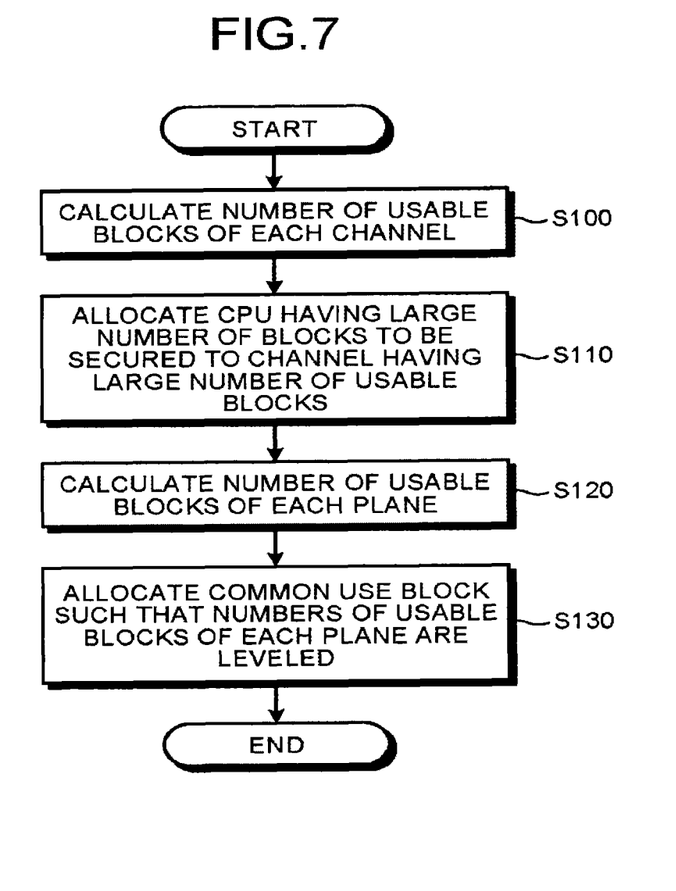
FIG. 7 is a flowchart that illustrates an example of the sequence of static partitioning according to an embodiment.

FIG. 7 is a flowchart that illustrates an example of the sequence of the static partitioning according to this embodiment. This static partitioning process is executed when the memory system 100 is manufactured by the manufacturing firmware.

First, system blocks that are targets for the static partitioning process will be described. The system blocks, as described above, include common use blocks that are used to be common to a plurality of CPUs #0 to #3 when the product firmware FW is operated and CPU dedicated blocks that are used by only one CPU. The common use block, for example, includes a root block, a manufacturing information block, a screening log block, a dump block, a debug log block, a work load log block, and a crypto module block.

In the root block, information of a root pointer is recorded. The root pointer includes address information used for tracing the management data MD managing data on the NAND 20 and the like. The information of the root pointer is updated by the product firmware FW. The manufacturing firmware secures an area for the root block and sets initial values.

In the manufacturing information block, various kinds of information at the time of manufacturing the memory chip, the chip information including the physical addresses of initial bad blocks, and information (physical addresses and the like) of emerging bad blocks are recorded. The chip information of the manufacturing time, as described above, is recorded in the ROM region 26 of each memory chip 21 of the NAND 20. After an area for the manufacturing information block is secured in the NAND 20, the manufacturing firmware copies the chip information of the manufacturing time that is stored in the ROM region 26 to the manufacturing information block. The information (physical addresses and the like) of emerging bad blocks is registered by the manufacturing firmware and the product firmware FW in a stage in which an emerging bad block is generated. At the time of performing a screening test to be described later, in a case where an emerging bad block is detected, the manufacturing firmware registers information of the emerging bad block in the manufacturing information block. In a case where an emerging bad block is detected during a normal operation of the memory system 100, the product firmware FW registers the information of the emerging bad block in the manufacturing information block.

In the screening log block, a log of screening tests performed by the manufacturing firmware is recorded. In the screening test, for example, data writing/reading is performed for a test target area of the NAND 20, and it is tested whether an race operation, a write operation, and a read operation can be normally performed for each block. The target area for the screening test is the entire storage area of the NAND 20 other than the ROM region 26. However, physical blocks registered as initial bad blocks in the ROM region 26 may be set as no targets for the screening test. Based on the log of screening tests, emerging bad blocks are detected. The screening log block is used by the manufacturing firmware but is not used by the product firmware FW.

In the dump block, in a case where an error event such as a malfunction occurs in the memory system 100, data acquired by dumping the states of the hardware and the firmware at that time is recorded by the product firmware FW. The manufacturing firmware secures an area used for the dump block.

In the debug log block, logs used for debugging and analysis are recorded by the product firmware FW. The manufacturing firmware secures an area used for the debug log block.

In the work load log block, during an operation securing period of the memory system 100 after the shipment of the memory system 100, a part of statistical information is sampled and recorded by the product firmware FW for every predetermined time. The manufacturing firmware secures an area used for the work load log block. In the statistical information, for example, a total number of bad blocks, a total number of times of erase, an average value of the number of times of erase, an accumulated value of the number of times of the occurrence of a write error for the NAND, an accumulated value of the number of times of the occurrence of an erase error for the NAND, and an accumulated value of the number of times of the occurrence of a read error for the NAND, the number of times of the occurrence of a communication error, the number of times of the occurrence of a temperature abnormality, and the like are included.

The crypto module block is used by a security module of the product firmware FW. In the crypto module block, a security log is recorded. The manufacturing firmware secures an area used for the crypto module block.

The dedicated block used for each CPU includes a trace log block. In the trace log block, trace logs of CPUs #0 to #3 at the time of executing the product firmware are recorded.

Figure 8:
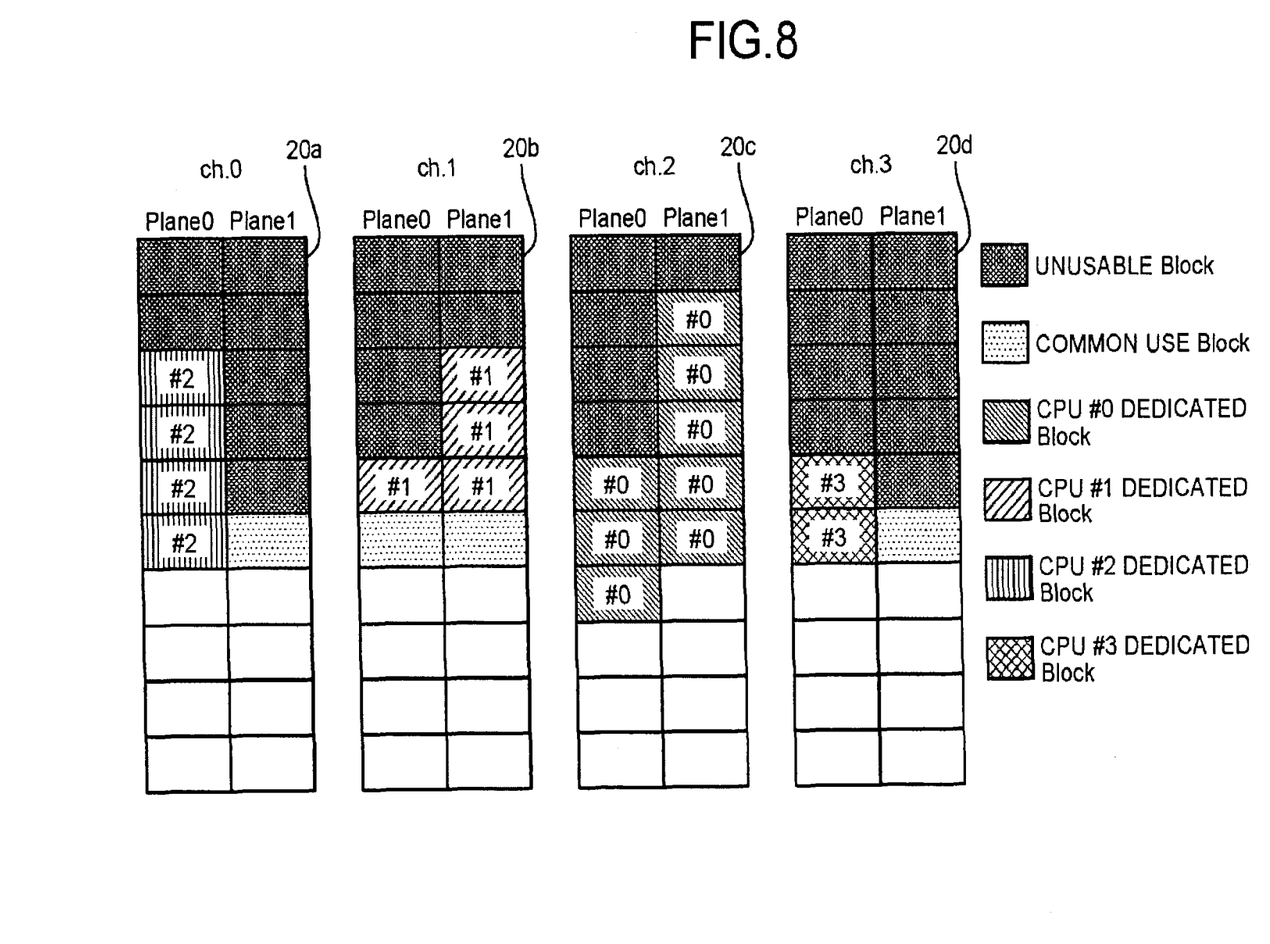
FIG. 8 is a conceptual diagram that illustrates an example of the static partitioning according to an embodiment.

Next, the operation sequence of the static partitioning according to this embodiment will be described with reference to FIGS. 7 and 8. FIG. 8 illustrates an example of the static partitioning according to the first embodiment. In the case illustrated in FIG. 8, the NAND 20 includes four channel parallel operation elements 20a to 20d, and one memory chip includes two planes (plane 0 and plane 1).

First, the manufacturing firmware requests the number Ns of usable blocks of each channel in Step 2100. The number Ns is acquired by subtracting the number of unusable blocks of each channel from the number of physical blocks of the channel. The unusable blocks, as described above, include initial bad blocks and a firmware block (a block used for the product firmware). As described above, the physical address information of the initial bad blocks is acquired from the ROM region 26 of each memory chip 21. As described above, the physical address of the firmware block is a fixed address.

The number Ns is 13 for channel ch. 0, is 14 for channel ch. 1, is 15 for channel ch. 2, and is 11 for channel ch. 3. The number Nap of usable blocks of each plane is eight for plane 0/ch. 0, is five for plane 1/ch. 0, is six for plane 0/ch. 1, is eight for plane 1/ch. 1, is six for plane 0/ch. 2, is nine for plane 1/ch. 2, is six for plane 0/ch. 3, and is five for plane 1/ch. 3.

Next, the manufacturing firmware allocates CPU dedicated blocks to Ns usable blocks of channels ch. 0 to ch. 3. The manufacturing firmware performs the allocation of the CPU dedicated C blocks such that used CPUs and used channels have one-to-one matching. For example, dedicated blocks of CPU #0 are allocated only to channel ch. 1, dedicated blocks of CPU #1 are allocated only to charnel ch. 2, dedicated blocks of CPU #2 are allocated only to channel ch. 2, and dedicated blocks of CPU #3 are allocated only to channel ch. 3. In this allocation process, the manufacturing firmware allocates a CPU having a large number Nt of dedicated blocks to be secured to a channel having a large number Ns of usable blocks in Step S110. In addition, the manufacturing firmware allocates the dedicated blocks such that the number of usable blocks of plane 0 after the allocation and the number of usable blocks of plane 1 after the allocation are the same. The number Nt of dedicated blocks is set in the manufacturing firmware.

The number of CPU #0 dedicated blocks is Nt=8. The number of CPU #1 dedicated blocks is Nt=4. The number of CPU #2 dedicated blocks is Nt=4. The number of CPU #3 dedicated blocks is Nt=2. For this reason, eight CPU #0 dedicated blocks are allocated to channel ch. 2.

In addition, four CPU #1 dedicated blocks are allocated to channel ch. 1. Furthermore, four CPU #2 dedicated blocks are allocated to channel ch. 0. In addition, two CPU #3 dedicated blocks are allocated to channel ch. 3. Furthermore, as the number Ntp of allocated dedicated blocks of each plane, Ntp=4 for plane 0/ch. 0, Ntp=0 for plane 1/ch. 0, Ntp=1 for plane 0/ch. 1, Ntp=3 for plane 1/ch. 1, Ntp=3 for plane 0/ch. 2, Ntp=5 for plane 1/ch. 2, Ntp=2 for plane 0/ch. 3, and Ntp=0 for plane 1/ch. 3.

Next, manufacturing firmware allocates common use blocks. The number of common use blocks to be secured is set in the manufacturing firmware. The manufacturing firmware requests the number Nrp of usable blocks of each plane in Step 3120. The number Nrp is acquired by subtracting the number Ntp from the number Nsp. The number Nr is four for plane 0/ch. 0, is five for plane 1/ch. 0, is five for plane 0/ch. 1, is five for plane 1/ch. 1, is three for plane 0/ch. 2, is four for plane 1/ch. 2, is four for plane 0/ch. 3, and is five for plane 1/ch. 3.

Next, the manufacturing firmware allocates common use blocks to (Nsp−Ntp) usable blocks of each plane such that the number Nqp of usable blocks after the allocation are leveled among the planes in Step S130. In other words, the manufacturing firmware allocates the common use blocks starting from a plane having a large number Nrp of usable blocks with high priority. In this case, since the number of the secured common use blocks is four, one of the common use blocks are allocated respectively to plane 1/ch. 0, plane 0/ch. 1, plane 1/ch. 1, and plane 1/ch. 3.

When the allocation of the system blocks ends in this way, the manufacturing firmware writes allocation information of the system blocks, for example, at a first address of the firmware block included in the unusable blocks. The allocation information of the system blocks includes identification information of system blocks, storage positions of the system blocks, and the like and instructs the product firmware FW the stored positions of the system blocks on the NAND 20. The identification information of the system block includes information that discriminates between the common use block and the CPU dedicated block. The identification information of the system block, in case of the information for the CPU dedicated block, includes information representing a CPU to which the block is dedicated, information representing one of the root block, the manufacturing info block, the screening log block, the dump block, the debug log block, the work load log block, and the crypto module block, and the like.

When various settings and s including the static partitioning according to the manufacturing firmware end, the manufacturing firmware stores the product firmware FW in a firmware block included in the unusable blocks of the NAND 20. In this way, the process according to the manufacturing firmware ends.

Thereafter, when power is input to the memory system 100 for the first time in the manufacturing stage, the product firmware FW stored in the NAND 20 executes a logical block building process. The product firmware FW recognizes the function and the physical address of each system block based on the allocation information of the system blocks that is stored in the firmware block included in the unusable blocks. In addition, the product firmware recognizes the physical addresses of the unusable blocks based on the information stored in the manufacturing info block. Accordingly, the product firmware FW, as illustrated in FIG. 8, recognizes a plurality of usable blocks (white blocks in FIG. 8) belonging to each plane that are acquired by excluding the unusable blocks and the system blocks (the common blocks and the CPU dedicated blocks) from a plurality of physical blocks belonging to each plane. The product firmware builds as many logical blocks as can be from the white blocks. The product firmware builds one logical block configured by eight physical blocks by selecting one physical block from each plane. By repeating such a process, a plurality of logical blocks are built. When the process of building a plurality of logical blocks ends, the product firmware allocates some logical blocks for the management data MD (the logical/physical translation table and the block management table) and allocates the remaining logical blocks for the user data UD. The identification information (physical block numbers) of a plurality of physical blocks configuring the logical blocks for the user data UD is registered in the block management table.

In this way, in the memory system 100, the CPU #0 dedicated block is allocated to channel ch. 2, the CPU #1 dedicated block is allocated to channel ch. 1, the CPU #2 dedicated block is allocated to channel ch. 0, and the CPU #3 dedicated block is allocated to channel ch. 3. For this reason, during a normal operation of the memory system 100, CPUs #0 to #3 can perform control of the NANDC 60 such that the CPU #0 to CPU #3 dedicated blocks are accessed in a parallel manner in a case where parallel accesses thereto can be made.

As above, in this embodiment, dedicated blocks for a plurality of CPUs are allocated such that dedicated blocks that are dedicatedly used by one CPU are intensively allocated to one channel. In other words, first system blocks used for a first CPU are intensively allocated to a first channel parallel operation element, and second system blocks used for a second CPU are intensively allocated to a second channel parallel operation element. For this reason, according to the first embodiment, during the operation of the memory system 100, a plurality of CPUs #0 to #3 can access the CPU #0 to CPU #3 dedicated blocks in a parallel manner. Accordingly, in a memory system performing control using a plurality of CPUs, high-efficiency accesses to system data can be made.

In addition, in the embodiment, a CPU having many dedicated blocks to be secured is allocated to a channel having a large number of usable blocks. In addition, the common use blocks are allocated such that the numbers of usable blocks after the allocation are leveled among the planes. For this reason, also in a case where there is a bias in the number of dedicated blocks for each CPU or in a case where there is a bias in the number of usable blocks of each channel, the numbers of usable blocks of the planes can be leveled. Accordingly, more logical blocks can be secured.

In addition, the functions of the memory controller 10 may be configured to be shared by eight CPUs #0 to #7. In such a case, for example, the functions are shared by the eight CPUs #0 to #7 as below.

CPU #0

CPU #0 receives a command of the host 90 from the host I/F 40 and, when a process corresponding to the received command is completed, performs a command completion notification for the host I/F 40. CPU #0 analyzes the received command and transmits a result of the analysis to CPU #1, CPU #5, and the like that control the back end unit.

CPU #1

CPU #1 executes a write/read operation for the write buffer and the read buffer arranged inside the RAM 30 by controlling the RAMC 50. CPU #1 controls writing/reading write data received from the host 90 into/from the write buffer of the RAM 30 and controls writing/reading data read from the NAND 20 into/from the read buffer of the RAM 30. CPU #1 notifies CPUs #2 and #3 of a request for updating the logical/physical translation table in accordance with writing/reading data into/from the RAM 30. In addition, CPU #1 transmits a request for reading/writing user data from/into the NAND 20 to CPU #5.

CPU #2

CPU #2 refers to and updates the logical/physical translation table for the data stored in the RAM 30 and the NAND 20.

CPU #3

CPU #3 refers to and updates the logical/physical translation table for the data stored in the RAM 30 and the NAND 20.

CPU #4

CPU #4 manages blocks. CPU #4 builds logical blocks, supplies the logical blocks to CPU #5, determines valid data in a compaction process, transmits a read/write request to CPU #5 for compaction, and requests the CPUs #2 and #3 to update the logical/physical translation table according to the compaction.

CPU #5

CPU #5 executes an error correction process. CPU #5 executes an error correction coding process for the write data, generates a parity, and generates a code word including the parity and the data. CPU #5 requests CPUs #6 and #7 to write the generated code word into the NAND 20. In addition, CPU #5 requests CPUs #2 and #3 to update logical/physical translation table according to the writing of the code word into the NAND 20. CPU #5 executes a decoding process for the code word read from the NAND 20.

CPU #6

CPU #6 controls the NANDC 60. For example, CPU #6 controls two channels that are a half of four channels.

CPU #7

CPU #7 controls the NANDC 60. For example, CPU #7 controls two channels that are a half of four channels.

In addition, in the description presented above, while a case of four CPUs and a case of eight CPUs have been described, the number of CPUs for sharing the functions of the memory controller 10 is arbitrary as long as the number is two or more. Furthermore, the sharing of the functions described above is merely an example, and different arbitrary sharing of the functions may be executed. In addition, in the embodiment described above, while the product firmware has been described to be stored in the NAND 20, the product firmware EN may be stored in the read only memory (ROM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a nonvolatile memory including first and second memories that are individually accessible, the first or second memory storing first information, the first memory including first blocks and second blocks, the second memory including third blocks and fourth blocks; and
   a controller including a first CPU and second CPU, the controller being configured to write data received from a host into the second blocks and the fourth blocks; wherein
   the first information includes addresses of the first blocks and third blocks, all of the addresses of the first blocks indicate addresses inside the first memory, all of the addresses of the third blocks indicate addresses inside the second memory, and the first information indicates that the first block is a block to which access by the first CPU is not restricted but access by the second CPU is restricted and the third block is a block to which access by the second CPU is not restricted but access by the first CPU is restricted.

2. The memory device according to claim 1, wherein the first CPU uses the first blocks and the second CPU uses the third blocks during operation.

3. The memory device according to claim 1, wherein a number of the second blocks and a number of the fourth blocks are leveled.

4. The memory device according to claim 1, wherein the first CPU records a first trace log of the first CPU into the first block, and the second CPU records a second trace log of the second CPU into the third block.

5. The memory device according to claim 2, wherein one of the first CPU and second CPU writes the data received from the host into a fifth block among the second blocks of the first memory and a sixth block among the fourth blocks of the second memory in parallel, the other of the first CPU and second CPU performs a communication process with the host.

6. The memory device according to claim 5, wherein the fifth block and the sixth block configure a logical block.

7. The memory device according to claim 1, wherein the first memory further includes a first unusable block, and the second memory further includes a second unusable block, the first unusable block including a first initial bad block or a first firmware block for storing first firmware, the second unusable block including a second initial bad block or a second firmware block for storing second firmware.

8. The memory device according to claim 1, wherein the first memory further includes a first common use block, the second memory further includes a second common use block, the first common use block is a block to which access by the first CPU and the second CPU are not restricted, the second common use block is a block to which access by the first CPU and the second CPU are not restricted.

9. The memory device according to claim 8, wherein the first information includes physical addresses of the first common use block and the second common use block, and the first information further indicates that the first common use block is a block to which access by the first CPU and the second CPU are not restricted, the second common use block is a block to which access by the first CPU and the second CPU are not restricted.

10. The memory device according to claim 9, wherein the first common use block or the second common use block includes a block in which pointer information for tracing management information has been recorded.

11. The memory device according to claim 9, wherein the first common use block or the second common use block includes a block in which manufacturing information has been recorded, the manufacturing information including physical addresses of initial bad blocks.

12. The memory device according to claim 11, wherein the manufacturing information further includes physical addresses of emerging bad blocks that is detected at the time of a screening test.

13. The memory device according to claim 11, wherein one of the first CPU and the second CPU registers information of an emerging bad block in the block in which manufacturing information has been recorded when an emerging bad block is detected.

14. The memory device according to claim 9, wherein the first common use block or the second common use block includes a block in which a log of screening tests has been recorded.

15. The memory device according to claim 9, wherein the first common use block or the second common use block includes a block in which a log used for debugging is recorded.

16. The memory device according to claim 9, wherein the first common use block or the second common use block includes a block in which statistical information is recorded, the statistical information including a total number of times of erase.

17. The memory device according to claim 9, wherein the first common use block or the second common use block includes a block in which a security log is recorded.

18. The memory device according to claim 1, wherein the first memory is a first memory chip and the second memory is a second memory chip.

19. The memory device according to claim 1, wherein the first memory is a first plane and the second memory is a second plane.

* * * * *